UNITED STATES PATENT OFFICE.

ALFRED TERZICH, OF SONORA, CALIFORNIA.

REMEDY FOR POISON-OAK RASH.

No. 906,084.  Specification of Letters Patent.  Patented Dec. 8, 1908.

Application filed September 23, 1907. Serial No. 394,057.

*To all whom it may concern:*

Be it known that I, ALFRED TERZICH, a citizen of the United States, residing at Sonora, in the county of Tuolumne and State of California, have invented or discovered a new and effective Remedy for Poison-Oak Rash; and I do declare the following to be a full, clear, and accurate description of the same, such as will enable others skilled in the art to which it appertains to make and use the same.

This invention or discovery relates to improved medicinal remedies and particularly to a remedy for poison oak rash, my object being to produce such an external remedy as will be easily and inexpensively compounded and one which will effect a quick and sure relief from the effects of such poison. This object I accomplish by means of the certain compounding and blending of elements as will appear by a perusal of the following specification and claims.

In preparing my remedy I take approximately eight pounds of soap root or *Chlorogalum*, four ounces of wild peach leaves or leaves of *Amygdalus persica*, four ounces of salt and one gallon of water and boil the same to make three quarts of liquid after the residue is strained therefrom. To three quarts of this liquid I add one quart of alcohol and one ounce of glycerin. This when well mixed is ready for use.

To apply this remedy rub the same thoroughly over all the parts affected with the poison oak rash about every hour and leave the same on.

This remedy I find will cure the most insistent case of poison oak rash within forty-eight hours after the first application thereof. Thus it will be seen from the foregoing formula that I have produced such a remedy as fulfils the objects of the invention as set forth herein.

While this specification sets forth in detail the present and preferred method of blending the several elements of my improved compound, still in practice such small deviations therefrom may be resorted to within the scope of my claims without departing from the spirit of my invention.

Having thus described my invention what I claim as new and useful and desire to secure by Letters Patent is:—

1. A topical remedy consisting of a mixture of three quarts of an aqueous decoction of the root of *Chlorogalum* and leaves of *Amygdalus persica*, with four ounces of salt, one quart of alcohol and one ounce of glycerin.

2. A topical remedy consisting of an aqueous decoction of the root of *Chlorogalum* and leaves of *Amygdalus persica*, and salt, alcohol and glycerin in about the proportions specified.

In testimony whereof I affix my signature in presence of two witnesses.

ALFRED TERZICH.

Witnesses:
F. P. OTIS,
AMY JONES.